(12) United States Patent
Al Sayeed (10) Patent No.: US 11,916,590 B2
(45) Date of Patent: Feb. 27, 2024

(54) DISTRIBUTED IN-SERVICE SPECTRUM POWER COMPENSATION

(71) Applicant: Ciena Corporation, Hanover, MD (US)

(72) Inventor: Choudhury A. Al Sayeed, Stittsville (CA)

(73) Assignee: Ciena Corporation, Hanover, MD (US)

( * ) Notice: Subject to any disclaimer, the term of this patent is extended or adjusted under 35 U.S.C. 154(b) by 233 days.

(21) Appl. No.: 17/534,687

(22) Filed: Nov. 24, 2021

(65) Prior Publication Data
US 2023/0163844 A1 May 25, 2023

(51) Int. Cl.
*H04B 10/079* (2013.01)

(52) U.S. Cl.
CPC .............................. *H04B 10/07955* (2013.01)

(58) Field of Classification Search
CPC ....................... H04B 10/07955; H04B 10/564; H04B 10/58; H04B 10/079; H04B 10/0791; H04B 10/0795; H04B 10/0797; H04B 10/0793; H04J 14/0221; H04J 14/02218; H04J 14/02216; H04J 14/02219
See application file for complete search history.

(56) References Cited

U.S. PATENT DOCUMENTS

| | | | |
|---|---|---|---|
| 8,364,036 B2 | 1/2013 | Boertjes et al. | |
| 8,509,621 B2 | 8/2013 | Boertjes et al. | |
| 9,344,191 B2 * | 5/2016 | Al Sayeed | .......... H04J 14/0221 |
| 9,419,708 B2 | 8/2016 | Rad et al. | |
| 9,485,013 B2 | 11/2016 | Al Sayeed et al. | |
| 9,577,763 B2 | 2/2017 | Al Sayeed et al. | |
| 9,729,265 B2 | 8/2017 | Hurley et al. | |
| 9,768,902 B2 | 9/2017 | Al Sayeed et al. | |
| 9,774,392 B2 | 9/2017 | Doucet et al. | |
| 9,806,803 B2 | 12/2017 | Bownass et al. | |
| 9,882,634 B1 | 1/2018 | Al Sayeed et al. | |
| 9,906,294 B2 | 2/2018 | Al Sayeed et al. | |
| 9,918,148 B2 | 3/2018 | Swinkels et al. | |
| 9,973,295 B2 | 5/2018 | Al Sayeed et al. | |
| 9,985,726 B1 * | 5/2018 | Al Sayeed | ......... H04B 10/0791 |
| 9,986,317 B1 | 5/2018 | Al Sayeed et al. | |

(Continued)

FOREIGN PATENT DOCUMENTS

| | | |
|---|---|---|
| EP | 2 993 807 B1 | 1/2018 |
| WO | 2020/102011 A1 | 5/2020 |

*Primary Examiner* — Hibret A Woldekidan
(74) *Attorney, Agent, or Firm* — Baratta Law PLLC; Lawrence A. Baratta, Jr.

(57) ABSTRACT

Systems and methods for compensating for spectrum power offsets with respect to a target profile are provided. A method, according to one implementation, includes determining whether an upstream controller is currently performing an upstream action, or intends to perform the upstream action soon thereafter, with respect to an upstream power compensation unit. The method also includes determining whether there is a need to perform a local action with respect to the local power compensation unit. Furthermore, the method includes the step of performing the local action with respect to the local power compensation unit in response to determining that (a) the upstream controller is not currently performing the upstream action (or does not intend to perform the upstream action soon thereafter) and (b) there is a need to perform the local action.

18 Claims, 7 Drawing Sheets

(56) References Cited

U.S. PATENT DOCUMENTS

| | | | |
|---|---|---|---|
| 10,063,313 B1 | 8/2018 | Al Sayeed et al. | |
| 10,237,011 B2 | 3/2019 | Al Sayeed et al. | |
| 10,361,957 B1 | 7/2019 | MacKay et al. | |
| 10,439,709 B1 | 10/2019 | Al Sayeed | |
| 10,536,235 B2 | 1/2020 | Al Sayeed et al. | |
| 10,560,212 B2 | 2/2020 | Al Sayeed et al. | |
| 10,587,339 B1 | 3/2020 | Al Sayeed et al. | |
| 10,680,737 B1 | 6/2020 | Al Sayeed et al. | |
| 10,686,543 B1 | 6/2020 | Al Sayeed et al. | |
| 10,735,837 B1 | 8/2020 | Al Sayeed et al. | |
| 10,826,601 B2 | 11/2020 | Bhatnagar et al. | |
| 10,826,641 B1 | 11/2020 | Al Sayeed et al. | |
| 10,833,791 B1 * | 11/2020 | Al Sayeed | H04J 14/0224 |
| 2019/0253361 A1 | 8/2019 | MacKay et al. | |
| 2020/0059315 A1 | 2/2020 | Al Sayeed et al. | |
| 2020/0076499 A1 | 3/2020 | Al Sayeed et al. | |
| 2020/0084331 A1 * | 3/2020 | Hall | H04N 1/00702 |

* cited by examiner

DISTRIBUTED IN-SERVICE SPECTRUM POWER COMPENSATION

TECHNICAL FIELD

The present disclosure generally relates to networking systems and methods. More particularly, the present disclosure relates to measuring the power of spectrum signals in an Optical Multiplex Section (OMS), determining whether there is a significant offset of the spectrum power from a target profile, and sequentially compensating for the power offset in a downstream direction.

BACKGROUND

Figure 1:
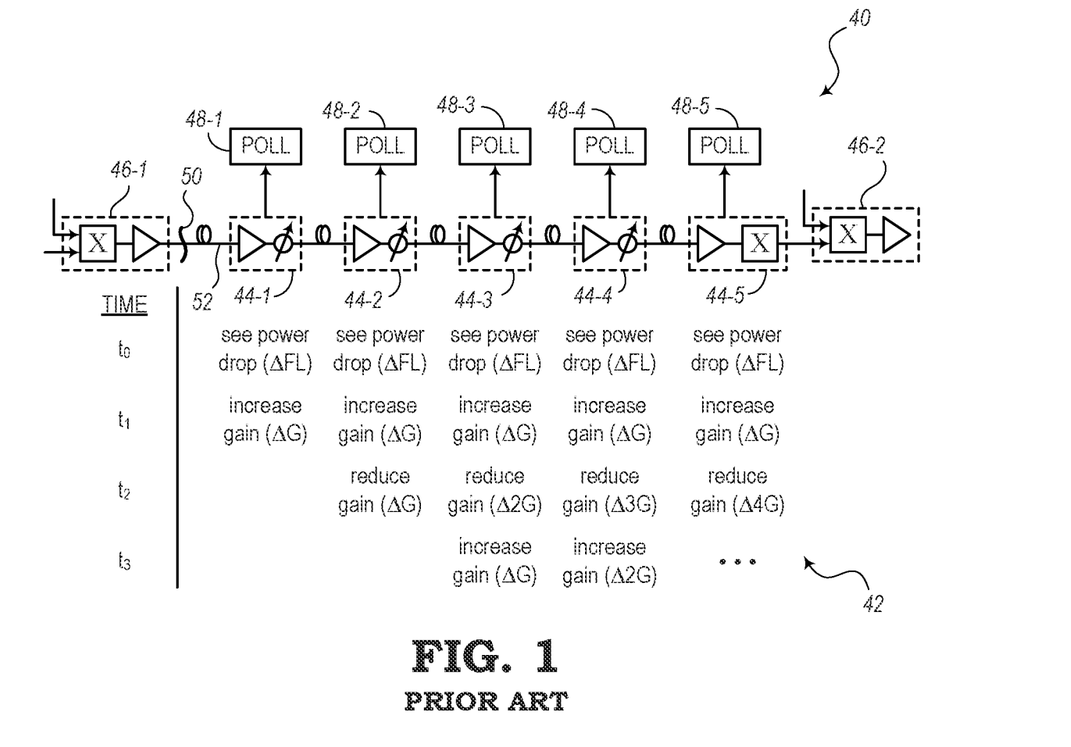
FIG. 1 is a diagram illustrating a conventional system for handling power losses over multiple fiber spans.

FIG. 1 is a diagram illustrating a conventional photonic line system 40 for handling power losses over multiple fiber spans. Also, FIG. 1 includes a chart 42 showing actions taken at each of a number of network elements in an attempt to compensate for power loss. The photonic line system 40 includes elements 44-1, 44-2, 44-3, 44-4, and 44-5 connected in a path between multiplexer elements 46-1, 46-2. In this example, elements 44-1, 44-2, 44-3, and 44-4 are amplifying elements and element 44-5 is a demultiplexing element. The photonic line system 40 further includes polling devices 48-1, 48-2, 48-3, 48-4, 48-5 for measuring power loss, which may be a total (accumulated power loss) or an additional loss that is determined to be above a normal baseline loss. The polling device 48 may be part of a local controller (e.g., similar to the arrangement shown in FIG. 1) or any type of measurement or polling component. Each polling device 48 is configured to measure the loss from a corresponding element 44.

In this example, a physical distress 50 (e.g., pinch) or defect (e.g., fiber break) is present on an upstream fiber link 52, causing additional attenuation or loss on the fiber link 52. As a result of the physical distress 50, the polling devices 48 are configured to determine the additional loss, whereby an associated controller may adjust the gain of an amplifier or actuator of the elements 44 to compensate for the loss.

According to the chart 42, each of the polling devices 48 are configured at time t0 to detect a drop (change) in power by a certain amount ΔFL. As seen in the chart 42, each polling device 48 detects the loss ΔFL caused by the physical distress 50 before any actions are taken by any device to compensate for the loss. Since each polling device 48 may assume that the loss has been caused by a defect or other condition with respect to the immediate upstream fiber link, each polling device 48 will then attempt to compensate. Thus, as shown at time t1, each of the controllers associated with the polling devices 48 increase the gain of its corresponding element 44 by ΔG (e.g., where ΔG=−ΔFL). However, it might be recognized at this point, that compensation is also simultaneously attempted at each of the previous elements 44.

After t1, the second polling device 48-2 (having increased its gain by ΔG) will see that the loss has already been compensated for by the previous amplifier (e.g., at the element 44-1) and that its own compensation provides a gain that is ΔG too high. To compensate for this ΔG overcompensation, the controller associated with the second polling device 48-2 will then reduce the gain by ΔG at time t2.

Also, after t1, the third polling device 48-3 (having increased its gain by ΔG) will see that the previous amplifiers (e.g., associated with elements 44-1 and 44-2) already provide an overcompensation of ΔG. Thus, the polling device 48-3 may attempt to compensate by reducing the gain by Δ2G at time t2. After t2 (after the controller associated with element 44-2 has reduced its gain), the controller with element 44-3 will need to increase its gain by ΔG again. It should be noted that this reactive approach can cause power fluctuations that can ripple through the section of the photonic line system 40.

The photonic line system 40 is configured to provide a span loss compensation mechanism from one fiber span to a downstream fiber span within an Optical Multiplex Section (OMS) or other section of the photonic line system 40. This is a power control based compensation. It is possible in this case to develop a power control-based compensation mechanism that can compensate any uncompensated offset coming from upstream without any sectional intervention. This means that, for each local controller, if its incoming power drops, it can increase the amplifier gain or decrease the Variable Optical Attenuator (VOA) loss to achieve a given target power at its output. However, this method will often cause downstream fluctuations as the amplifiers and VOA overcompensate for losses. This is caused by upstream controllers making similar adjustments, which results in the generation of ringing in the photonic line system 10, although the amplifiers and VOAs will eventually settle down to a final steady state.

To correct this overcompensation, some systems may include a damped per-channel power controller technique that limits the overall overshoot up to N×number of cascaded controllers. This type of system may have very long convergence times (e.g., 10-20 minutes over a chain of about 10 controllers) and hence may not be suitable for a chain of amplifiers. For example, it may be preferred to control the spectrum power for an amplifier instead of its per-channel power. An activity in a band impacts the neighboring band spectrum and more sequential activities may be required or need to be sacrificed in the convergence time. Also, the spectrum power control comes with total power or average error, tilt, and ripple adjustments that may need to be done in sequence (among a plurality of bands). Again, this technique could be used for average or total power error, but may not be suitable for tilt and ripple adjustments without sacrificing the convergence time significantly.

Figure 2:
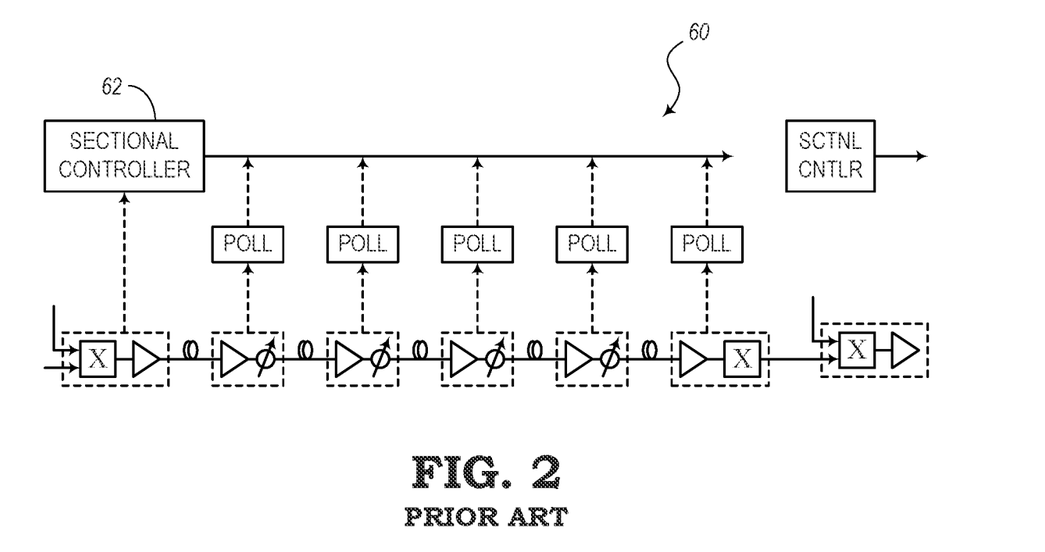
FIG. 2 is a schematic diagram illustrating another conventional system for handling power losses over multiple fiber spans.

FIG. 2 is a schematic diagram illustrating a photonic line system 60 according to another conventional system, where the photonic line system 60 is configured for handling power losses over multiple fiber spans. The photonic line system 60 includes a sectional controller 62 in addition to elements similar to the photonic line system 40 of FIG. 1, including elements and polling devices associated with measuring and controlling the corresponding elements as described above.

According to the implementation of the photonic line system 60 of FIG. 2, a local controller (associated with the polling devices) runs on each fiber link to receive signals at the end of the corresponding fiber link and to provide a certain level of compensation for losses. The sectional controller 62 may be configured to run at a section head for an OMS. The sectional controller 62 may be configured to periodically poll each span for power data. In various embodiments, the poll may include measured or estimated power loss values.

From receiving the polls, the sectional controller 62 is configured to calculate for any power shortfall (beyond a normal baseline level or predefined launch target), referred to as a compensation shortfall. The sectional controller 62 accumulates all power offset calculations and then re-distributes the power offset compensation over the downstream fiber links within its control. The sectional controller 62 may store information related to a full topological view of the photonic line system 60 in order to be able to properly communicate over this entire section. If communication is interrupted for a given span, the sectional controller 62 may remain frozen until the issue can be resolved.

The sectional controller 62 may monitor channel power offsets in each span within an OMS and may provide control such that a lack of compensation from one span may be distributed to downstream spans, depending on which local controllers may have the necessary dynamic range to compensate for the offset. While this solution may be useful in many situations, this type of system depends on section-wide communication and messaging. That is, the sectional controller 62 will need to be configured with the ability to send message to every other controller within the OMS and the ability to read data from them on a timely fashion to make control decisions.

In some embodiments, the sectional controller 62 from an upstream OMS or photonic line system may pass power offset information to a downstream sectional controller associated with another (downstream) OMS. Each sectional controller in this case may run its own power and Optical Signal-to-Noise Ratio (OSNR) control to compensate for any per-channel power drop coming from upstream and uncompensated gain when an upstream OMS has managed to complete compensation on its own. However, there is a possibility that this can lead to instability to the network in some cases as sectional controllers, without proper limitations, may attempt to chase power offsets. Due to explicit communication dependency within sections, a network operator may try to use a sectional controller that can bookend an OMS using equipment from the same vendor.

It is possible to develop a power-control-based compensation mechanism for each local span controller that can compensate any uncompensated power offset coming from upstream without any sectional intervention (i.e., no section-wide communication dependency). This means that, for each local controller, if the incoming power drops, it increases the gain or reduces the VOA loss to achieve a given target power at a downstream fiber link. However, this method may cause downstream amplifiers to fluctuate with their gain or VOA losses caused by at least one or more upstream controllers also making similar adjustments. Again, this may generate ringing in the line system, although eventually the amplifiers will settle down to a final steady state. In some cases, such large power swings can have a negative impact on traffic.

The photonic line system 60 is an OMS-based sectional compensation system for a Domain Optical Controller (DOC) or Sectional Optical Controller (SOC). Information from the sectional controller from upstream does not pass power offset information to a downstream sectional controller. Local sectional controllers may be configured to run their own power control functions. In some cases, a sectional controller may accumulate per span power offset and then distributes the offset to all downstream span controllers.

A local controller may be configured to run on each fiber span. A sectional controller may be configured to run at section head for an OMS and may periodically poll each span power data (e.g., measured or estimated) and calculate any power shortfall from a pre-defined launch target. The sectional controller may accumulate all power offset calculations and then re-distribute the power offset compensation over the downstream spans within its "span of control."

Sectional controllers typically require a full topological view and communication over the full-section. If communication is interrupted for a given span, the sectional controller remains frozen until the issue can be resolved. The sectional controller from upstream may pass power offset information to a downstream sectional controller. Each sectional controller may run its own power or Optical Signal to Noise Ratio (OSNR) control to compensate for any per-channel power drop coming from upstream and then un-compensate again when an upstream controller manages to complete compensation on its own. Again, this can lead to further instability to the network in some cases as sectional controllers may chase power offsets. Due to explicit communication dependency, sectional controllers may try to build bookended OMS from the same vendors' equipment. There is therefore a need in the field of networking systems to overcome the ringing and other overcompensation effects when attempting to reduce power offsets.

BRIEF SUMMARY

The present disclosure is directed to systems and methods for performing compensation action in response to determining that spectrum power (e.g., power levels of multiple optical channels within a spectrum) has strayed outside acceptable tolerances. The compensation actions can be coordinated by local controllers to ensure that an upstream offset compensation unit is adjusted first to compensate for the spectrum power offset, thereafter, allowing compensation actions in the next offset compensation unit, and so on in a downstream-directed sequence. In this way, parallel compensation actions are avoided, which can cause ringing or other undesirable effects in a network.

A method for handling spectrum power offset compensation, according to one implementation, includes a step of determining whether an upstream controller is currently performing an upstream action, or intends to (immediately) perform the upstream action (or soon thereafter), with respect to an upstream power compensation unit. The method also includes the step of determining whether there is a need to perform a local action with respect to the local power compensation unit. Also, the method includes the step of performing the local action with respect to the local power compensation unit in response to determining that a) the upstream controller is not currently performing the upstream action or does not intend to immediately perform the upstream action, and b) there is a need to perform the local action.

Also, in some embodiments, the "upstream action" may include adjusting the upstream power compensation unit to compensate for power offsets in spectrum signals at an output of the upstream power compensation unit, and the "local action" may include adjusting the local power compensation unit to compensate for power offsets in spectrum signals at an output of the local power compensation unit. In response to determining that the upstream controller is currently performing the upstream action or intends to immediately perform the upstream action, the method may also include waiting for the upstream controller to complete the upstream action before performing the local action.

The step of determining if there is a need to perform the local action may include a) measuring a spectrum power profile, b) comparing the measured spectrum power profile with a target spectrum power profile, and c) determining if the measured spectrum power profiled is within an acceptable tolerance with respect to the target spectrum power profile. In response to determining that there is a need to perform the local action, the method may also include determining whether channels of a spectrum include traffic-carrying signals or Amplified Spontaneous Emission (ASE) signals. In response to determining that the channels include traffic-carrying signals, the method may include performing a partial spectrum power compensation action with respect to the local power compensation unit, while, in response to determining that the channels include ASE signals, the method may include performing a full spectrum power compensation action with respect to the local power compensation unit.

In some embodiments, the step of determining that the upstream controller does not intend to immediately perform the upstream action may include receiving a baton flag from the upstream controller. Also, the method may include determining if a downstream controller intends to immediately perform a downstream action with respect to a downstream power compensation unit. Then, the step of performing a partial spectrum power compensation action with respect to the local power compensation unit may be executed in response to determining that the downstream controller intends to immediately perform the downstream action. The method may be executed, for example, so as to ensure that the upstream controller, local controller, and downstream controller perform the actions with respect to the associated upstream power compensation unit, local power compensation unit, and downstream power compensation unit one at a time in a downstream-directed sequence.

In addition, the local power compensation unit and upstream power compensation unit may be arranged in an Optical Multiplex Section (OMS) or other suitable section of a network and may perform the local action and upstream action, respectively, to reduce spectrum power offsets in the OMS while the OMS is in service. According to some embodiments, upon receiving an indication from the upstream controller that the upstream controller intends to immediately perform the upstream action while the local action is being performed, the method may further include aborting the local action and waiting for the completion of the upstream action.

BRIEF DESCRIPTION OF THE DRAWINGS

The present disclosure is illustrated and described herein with reference to the various drawings. Like reference numbers are used to denote like components/steps, as appropriate. Unless otherwise noted, components depicted in the drawings are not necessarily drawn to scale.

DETAILED DESCRIPTION

Figure 3:
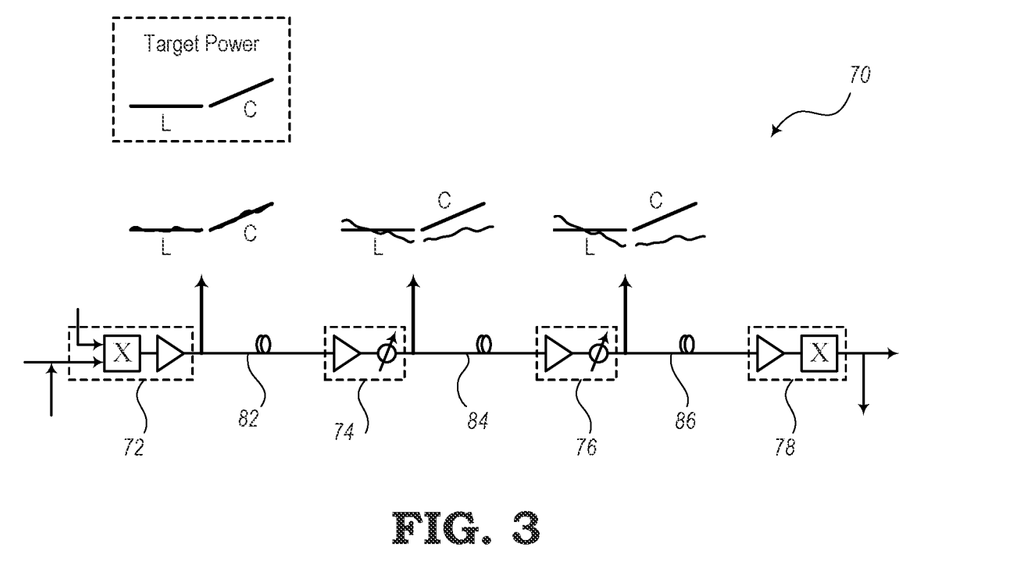
FIG. 3 is a schematic diagram illustrating a control system used in an Optical Multiplex Section (OMS), according to various embodiments of the present disclosure.
Figure 4:
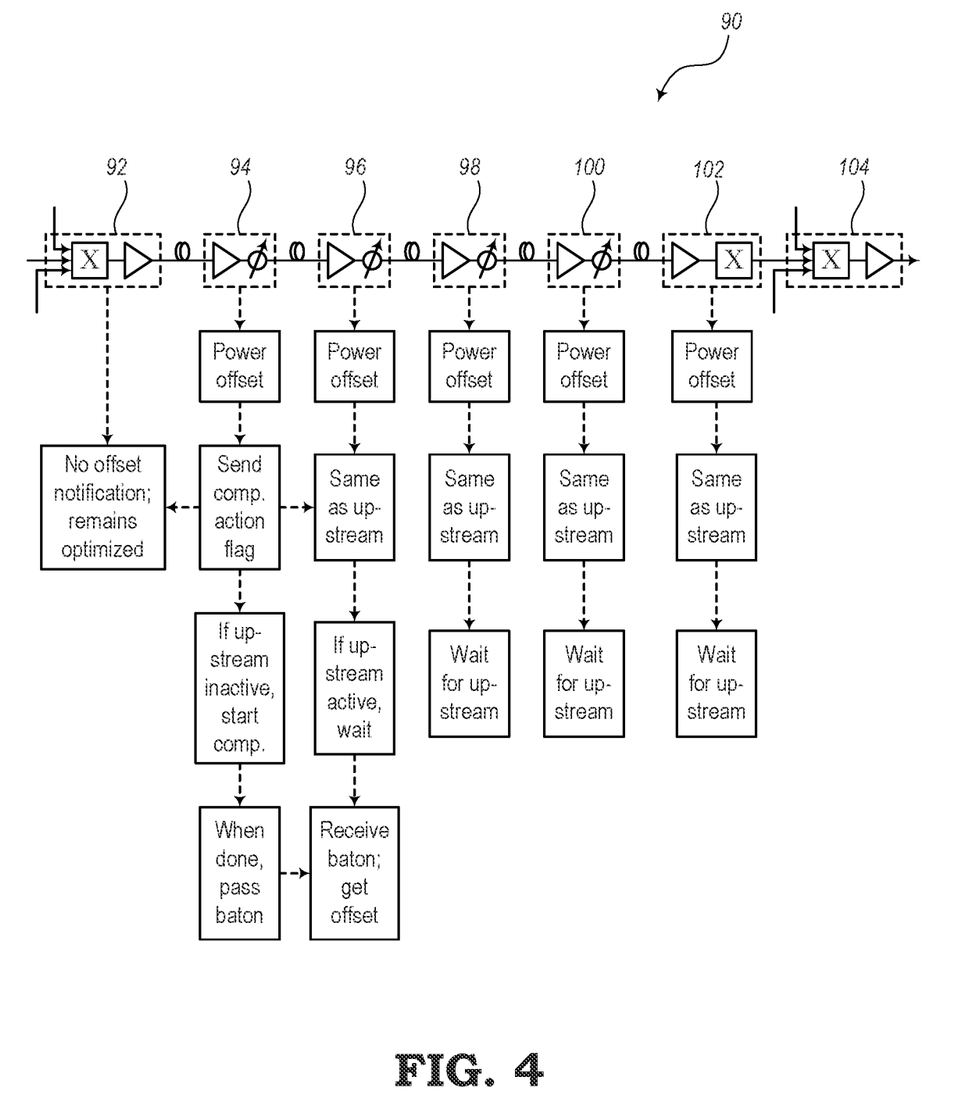
FIG. 4 is a diagram illustrating a power offset compensation system and corresponding functionality, according to various embodiments of the present disclosure.
Figure 5:
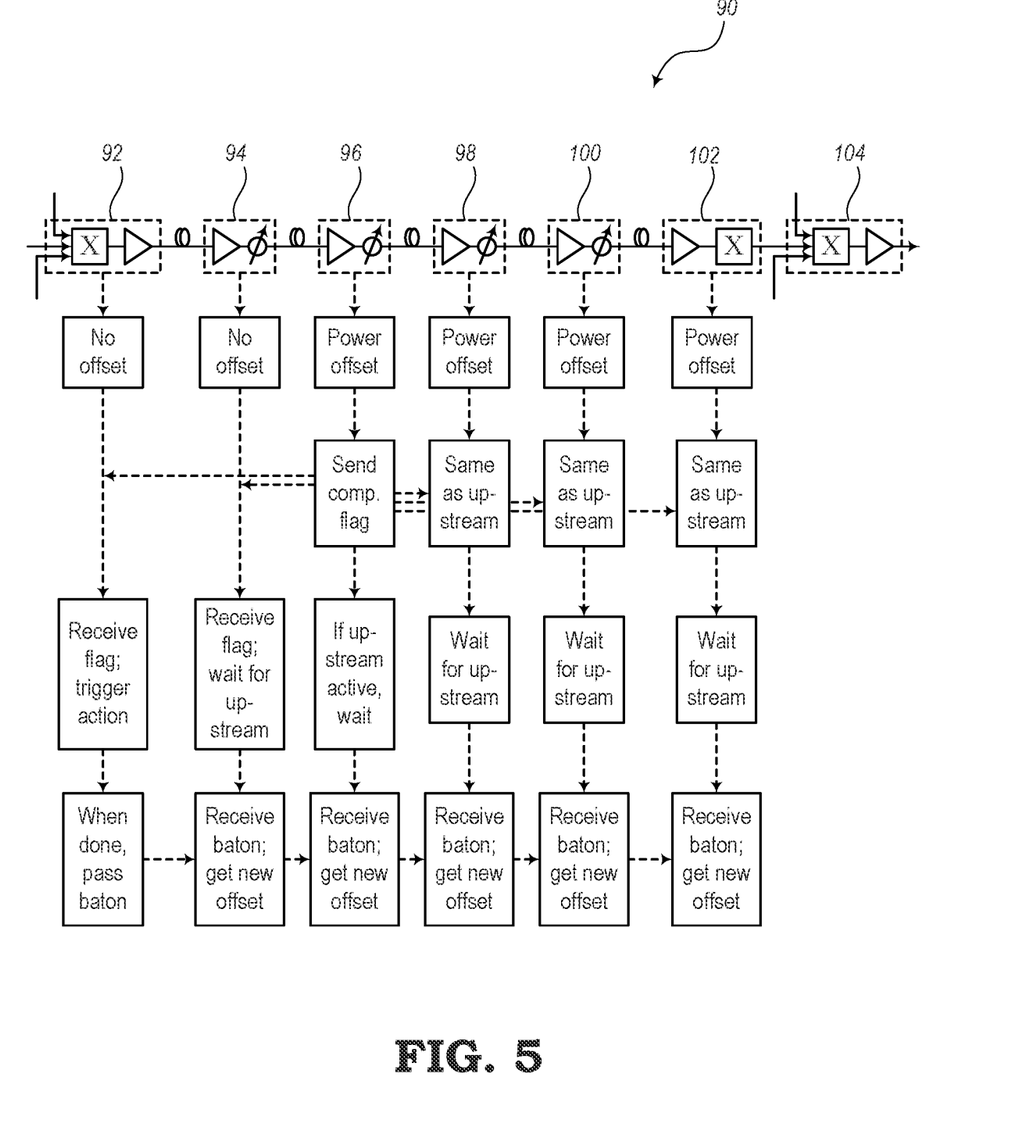
FIG. 5 is a diagram illustrating the power offset compensation system of FIG. 4 and other corresponding functionality, according to various embodiments of the present disclosure.

The embodiments shown in FIGS. 3-5 show examples of photonic line systems and control systems for transmission of signals in a single direction (i.e., from left to right on the page). However, it should be noted that the systems may be bi-directional, whereby the network elements may include equipment for transmission in the opposite direction as well (i.e., from right to left). However, for the sake of simplicity, only one direction is shown and described.

FIG. 3 is a schematic diagram illustrating an embodiment of a control system 70 used in an Optical Multiplex Section (OMS). The control system 70 includes a multiplexing element 72, a first amplifying element 74, a second amplifying element 76, and a demultiplexing element 78. The multiplexing element 72 and first amplifying element 74 are connected by a first fiber link 82. The first and second amplifying elements 74, 76 are connected by a second fiber link 84. Also, the second amplifying element 76 and the demultiplexing element 78 are connected by a third fiber link 86.

Generally, FIG. 3 also shows target power levels for both the L-band and C-band. Monitoring devices may be used at the outputs of the multiplexing element 72 and the first and second amplifying elements 74, 76. In this example, the power output of the channels of the spectrum at the output of the multiplexing element 72 is sufficiently near the target power profile and therefore does not require compensation. However, it may be seen that the output of the first amplifying element 74 shows an offset in the power profile. Particularly, the offset in the L-band includes power above the target at the lower frequencies and power below the target at the higher frequencies. However, it can also be seen in this example that the power throughout the C-band is below the target power is continues to generally drop with respect to the C-band in the higher frequency range. Also, the output of the second amplifying element 76 shows an even greater offset from the target power levels across the range of frequencies in both the L-band and C-band.

Thus, the control system 70 shown in FIG. 3 illustrates a spectrum power offset over a span (e.g., OMS). For example, there may be multiple reasons why the spectrum power may potentially drop (or increase) over a fiber span. Some reasons for spectrum power offset may include:

1. the increase/decrease of fiber loss, which could cause downstream gain/loss actuators to run out of dynamic range;
2. the presence of hardware errors due to accuracy degrade, aging, sub-system or component failures, etc.;
3. the change of a target launch profile for a given span over time to compensate for fiber aging (or SNR optimization) to get more SNR margin for certain parts of the spectrum, where such target profile changes could be imposed by a Software-Defined Networking (SDN) system or network operator over a plurality of fiber spans (within an OMS); and
4. compensation for spectrum power offset over submarine links (or links with stretched span with no Optical Supervisory Channel (OSC), telemetry, nor other supervisory communication with an upstream controller).

For fiber loss compensation (e.g., as described in U.S. Pat. No. 10,985,838), distributed local controllers may be designed per span to compensate for any upstream fiber loss and adjust actuators to compensate for further changes. If there is a shortfall due to lack of dynamic range, then this system can transfer the shortfall to next downstream controller for compensation. This method teaches how distributed local controllers can coordinate with each other to compensate for upstream shortfall against "fiber loss" changes, and hence, may be sufficient to cover reason #1 above.

However, the various embodiments of the present disclosure are configured to compensate for reasons #2-4 above. These embodiments may be configured to cover for a "spectrum power" decrease/increase (i.e., offset) in a fiber span. Since each local controller in many conventional systems may be configured to focus on compensating upstream span loss changes, they might not pick up a power offset coming from upstream. Hence, power drop may continue to all downstream spans, which may impact link budget. For any span loss changes in any upstream spans, a local power controller can keep reacting, which can result in the generation of power fluctuations over the network.

However, according to the present embodiments, if each local controller is designed to pick up "power offsets" coming from upstream, then each span can effectively run its own power controller and compensate for power offsets in a downstream-directed sequence. The embodiments of present disclosure are directed to overcoming the offset caused by reasons #2-4 mentioned above, where spectrum launch power could be lower or higher than a given target launch profile in an in-service system (e.g., with or without traffic channels present), and how such spectrum power offsets can be minimized with a distributed control mechanism, even with no dependency on end-to-end communication.

The present disclosure concentrates on spectrum power offsets handling within an OMS with distributed sequencing that does not allow running more than one controller at a time. By running controllers only one at a time, it is possible to avoid spectrum perturbations experienced in conventional systems. Each controller has a "local" trigger to run power-offset compensation but is gated by a "stable" upstream condition (i.e., only following a successful completion of upstream offset compensation). If there is no incoming supervisory communication provided (e.g., no OSC or telemetry signaling expected from upstream), then the local controller is configured to continue with compensation based on local triggers only.

FIG. 4 is a diagram illustrating an embodiment of a power offset compensation system 90 arranged along a photonic line system. Also shown in FIG. 4 is a description of various actions or functionality corresponding to controllers associated with network elements. In this embodiment, the photonic line system includes a first multiplexing element 92, first, second, third, and fourth amplifying elements 94, 96, 98, 100, a demultiplexing element 102, and a second multiplexing element 104. The network elements 92, 94, 96, 98, 100, and 102 are associated with one OMS, while the second multiplexing element 104 is associated with a downstream OMS.

Each network element 92, 94, 96, 98, 100, 102 of the OMS includes a local controller (not shown) that is configured to obtain measurements of the corresponding element and provide power compensation as needed to compensate for spectrum power offsets. For example, power compensation may include increasing or decreasing a corresponding amplifier component associated with each network element 92, 94, 96, 98, 100, 102 and/or increasing or decreasing a Variable Optical Attenuator (VOA) component associated with each network element 92, 94, 96, 98, 100, 102. The increasing/decreasing of the amplifier component and/or VOA component may include compensating for one or more channels in an optical spectrum to compensate for power offsets from target power levels. The optical spectrum may include any suitable frequency ranges (e.g., C-band plus L-band). Also, the controllers are configured to communicate with each other (e.g., without a centralized controller). The network elements 92, 94, 96, 98, 100, 102, for example, may be connected to each other via one or more fiber links or fiber spans.

The functionality of each of the various controllers is depicted in the blocks shown below the schematic representation of the network elements 92, 94, 96, 98, 100, 102. For example, as illustrated, the local controller associated with the first multiplexing element 92 does not measure a power offset that differs from a target power profile by a significant amount. Thus, this local controller does not require any type of compensation. However, in this example, a power offset is detected with respect to the spectrum power at the outputs of elements 94, 96, 98, 100, 102. In this case, the controller associated with the first amplifying element 94 is configured to send (i.e., advertise) a compensation action flag indicating that an in-service compensation action is required. This flag may be advertised to at least the neighboring upstream controller and the neighboring downstream controller.

Also, the local controller associated with element 94 is configured to look upstream to see that the upstream controller is inactive and therefore no compensation actions are currently running on the element 92. As such, the local controller associated with element 94 is configured to start the compensation action with respect to the corresponding element (e.g., the first amplifying element 94) to adjust the power as needed to better match the target power spectrum profile.

Once the local controller associated with element 94 completes the compensation action (e.g., optimization of the power matching to the target power), then the local controller sends a signal (e.g., flag), such as a "baton" flag, to the neighboring controller (e.g., associated with element 96). Then, the next local controller associated with the next element (e.g., the second amplifying element 96) is configured to receive the baton, so to speak, or completion indicator. When this local controller receives the baton from the upstream controller, it is configured to reevaluate any power offsets, which may be lessened by the action of the upstream compensation. If it is determined by the local controller associated with the element 96 that the upstream controller is no longer active (or it receives the baton), then it can proceed with any compensation actions with respect to the element 96 to compensate for the measured power offset of the spectrum or channels. This process is configured to continue down the lane for each local controller, which may include waiting for the neighboring upstream controller to finish compensation actions before proceeding to its own local compensation actions.

The power offset compensation system 90 is therefore configured as a distributed sequencing system where one local controller is configured to operate at a time to compensate for power offsets. The sequence of power offset compensation may proceed in a direction that starts at a head-end or upstream controller and move downstream. The power offset compensation system 90 is configured to causing the set of distributed controllers to follow this downstream-directed sequence. Also, the power offset compensation system 90 is configured to perform a gradual (and/or proportional) control optimization technique.

Each local controller is configured to wait for the upstream controllers to complete their actions before performing their own compensation actions. In some embodiments, the local controller may be configured wait a predetermined time for the upstream elements to stabilize before performing local compensation. Thus, by waiting, a local re-evaluation can obtain a more accurate measure of a power profile after the upstream control actions are implemented and can be "felt" downstream. The completion can be detected by an inactive upstream controller or by receiving the baton (or flag) that indicates that upstream actions are done.

The local controllers can receive notification for spectrum or channel power offsets from a given target, wherein such power offset notification can be due to drop or overshoot in spectrum power, tilt, or ripple compared to a target launch power to a corresponding fiber span. Also, the local controllers can publish (or advertise) an "intention" to run an optimization action to compensate for the power offsets. The local controllers can check the status of all other controllers within the OMS to see if they are already busy running any compensation actions.

If all local controllers within the OMS are inactive and an immediate upstream controller has no intention of running any actions, then the local controller can start optimization actions right away to reduce or eliminate power offsets. Once the power profile is sufficiently converged, the local controller can then publish the state to other controllers or pass the baton to the immediate downstream controller to enable sequential actions.

For example, if any other controllers are already busy running power offset compensation actions, then the local controller waits until the OMS is in a steady state. Otherwise, running compensation actions in both upstream and downstream elements may generate unnecessary power oscillations as experienced in many conventional systems. If an immediate upstream controller has an intention to run an action, then the local controller is configured to wait until the upstream controller has completed compensation and reported (e.g., passed the baton) that compensation is complete. In some cases, the local controller may detect if the upstream controller goes into a dormant state (e.g., is inactive or idle) in order to avoid collisions with upstream actions. In addition, if an upstream controller changes its intention to run a compensation action (e.g., from no intention to compensate to a new intention to compensate), then any other downstream controller is configured to abort its existing power offset compensation operations in order to allow the upstream controller to compensate first, which may thereby shorten the optimization response time.

The embodiment of the power offset compensation system 90 described in the present disclosure may have several advantages over the conventional systems known in the art. For example, one advantage of the power offset compensation system 90 is that the method does not require section-wide end-to-end communication dependency. For each controller, if it detects a power offset, it only needs to check the status of the upstream controller before running local compensation actions. After this, it may then pass the baton on to the next controller associated with the next element in the photonic line system. Another advantage is that having the communication with all downstream controllers adds the extra value of avoiding unnecessary perturbations as it prevents an upstream controller running, while downstream is in-action.

According to some embodiments, if the local controller has incoming spectrum measurement capability, then it can check if a power offset (e.g., in terms of total power, tilt, ripple, etc.) is present at the incoming spectrum. It may be configured to take no action on compensating for outgoing power-offsets until the incoming spectrum meets a previously calibrated snapshot or the local controller receives a notification (e.g., baton) from the upstream controller indicating the completion of the upstream power offset compensation actions (or optimization actions). Also, this may provide extra protection if there is a communications outage with upstream nodes/controllers, whereby the power offset measurements are effectively coming from upstream. This enables the local controllers to avoid multiple compensation actions and unnecessary power oscillations at their outputs. Instead, the system maintains a sequence of control activities, even if there is communications outage in the middle of the photonic line system.

The embodiments of the present disclosure focus on the handling of spectrum power offsets within an OMS. To compensate for these spectrum power offsets, the system is configured to enable a distributed sequencing that is configured to ensure that only one controller is allowed to run at a time, which can thereby avoid the spectrum perturbations seen in conventional systems.

Each controller may have a local "trigger" to run power offset compensation, but may also be gated by (dependent upon) a "stable" upstream condition (e.g., following a successful upstream completion, receiving a baton or other suitable flag signal, detecting inactivity in the upstream controller, etc.). If there is no incoming supervisory communication provisioned (e.g., no OSC or telemetry signaling expected from upstream), then the local controller can proceed based on a local trigger.

In addition, the local controller can maintain knowledge of traffic channel existence within the OMS. If traffic-carrying signal are present in the OMS (e.g., section-multiplexer pixels switched to traffic ports), the OMS may be considered to be "in service." While in service, compensation may be performed in a more gradual fashion so that further downstream OMS controllers (if any) are given enough time to converge and react. However, if there are no channels present or all the channels have been replaced with Amplified Spontaneous Emission (ASE) signals (e.g., section-multiplexer pixels are switched to ASE), then the OMS is considered to be ASE-loaded. While in the ASE-loaded condition, a faster offset compensation procedure may be applied since the ASE spectrum is confined within the OMS.

The present disclosure may be configured to perform gradual compensation techniques and/or full compensation techniques depending on various criteria (e.g., in-service channels vs ASE-loaded channels, or other various conditions). For an X dB of spectrum power offsets (total power or average power spectral density error, or spectrum-power-tilt offsets from a given target), an example of a gradual compensation technique may include applying a proportional adjustment to actuators so that only a fraction of X dB is compensated at a time. Such proportional adjustment includes configuring plurality of actuators, for example, and/or different types of actuator adjustments. For example, some adjustments may include pixel attenuations on spectrum selective switches (e.g., Wavelength Selective Switching (WSS) devices or the like) that could potentially be invoked in bundles. Some adjustments may also include target gain/tilt adjustment among a plurality of cascaded optical amplifiers in multiple sequential steps or limited proportional step-size (e.g., step-size of ≤Y dB, where Y=Kp*X, Kp<1, and X=average measured error from the target). Also, adjustments may include target loss adjustments on VOAs in multiple steps or limited step-sizes.

On the other hand, one example of a faster offset compensation technique may include configuring a plurality of actuators. However, this may be done in single steps with 100% of proportional changes (e.g., with Kp=1). Along with adjustments done gradually, the present system may also add per-span ripple adjustments per spectrum band if a Dynamic Gain Flattening Filter (DGFF) function is available at the span control level and no traffic channels are available in the section.

FIG. 5 is a diagram illustrating the power offset compensation system 90 of FIG. 4. However, the local controllers (not shown) include different functionality for performing spectrum power offset compensation. For example, this embodiment includes a distributed sequencing plan with a section-wide action trigger.

There may be cases where a local controller may receive notifications for spectrum power offsets at its output monitoring point in which a majority of the measured offsets are likely to be contributed from upstream. However, upstream controllers may not raise an "action-required" flag since the corresponding power offsets may not necessarily cross any notification thresholds but may instead remain within acceptable tolerances.

In some embodiments, optimizing downstream spans may not result in a performance optimized solution, and thus it may be worth it to trigger a section-wide optimization action sequencing from head to tail. To resolve that, a section-wide optimization action is triggered that runs from head to tail in sequence as soon as one local controller detects spectrum power offsets from its target against any given band (e.g., C-band, L-band, or both).

If for an upstream controller, the spectrum-power is already at a target within some error limit (or dead zone), then the controllers can report a converged or optimized condition and pass the sequence to the next controller in line to force a downstream power evaluation where further offset compensation actions can be run if necessary. Since this may require an end-to-end section view and control communications, a local controller can optionally raise for a section-wide optimization required flag only when an end-to-end section view is visible locally.

Figure 6:
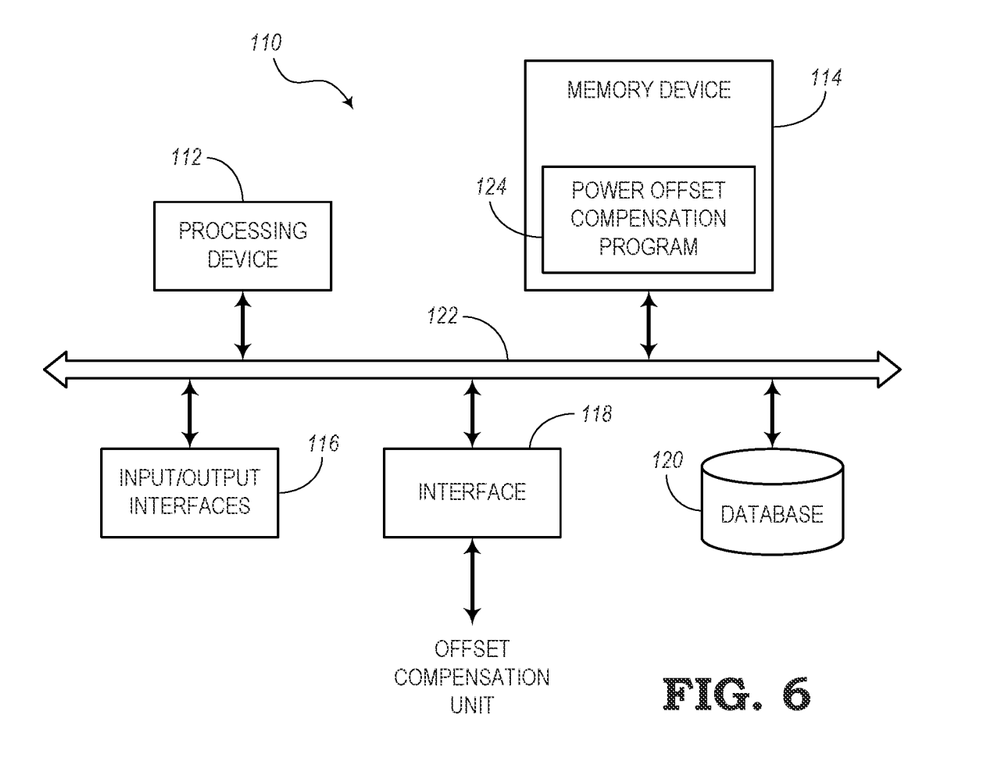
FIG. 6 is a block diagram illustrating a control device for handling the compensation of power fluctuations in an OMS, according to various embodiments of the present disclosure.

FIG. 6 is a block diagram illustrating an embodiment of a control device 110 for handling the compensation of power fluctuations in an OMS. In the illustrated embodiment, the control device 110 may be a digital computing device that generally includes a processing device 112, a memory device 114, Input/Output (I/O) interfaces 116, an interface 118, and a database 120. It should be appreciated that FIG. 6 depicts the control device 110 in a simplified manner, where some embodiments may include additional components and suitably configured processing logic to support known or conventional operating features. The components (i.e., 112, 114, 116, 118, 120) may be communicatively coupled via a local interface 122. The local interface 122 may include, for example, one or more buses or other wired or wireless connections. The local interface 122 may also include controllers, buffers, caches, drivers, repeaters, receivers, among other elements, to enable communication. Further, the local interface 122 may include address, control, and/or data connections to enable appropriate communications among the components 112, 114, 116, 118, 120.

It should be appreciated that the processing device 112, according to some embodiments, may include or utilize one or more generic or specialized processors (e.g., microprocessors, CPUs, Digital Signal Processors (DSPs), Network Processors (NPs), Network Processing Units (NPUs), Graphics Processing Units (GPUs), Field Programmable Gate Arrays (FPGAs), semiconductor-based devices, chips, and the like). The processing device 112 may also include or utilize stored program instructions (e.g., stored in hardware, software, and/or firmware) for control of the control device 110 by executing the program instructions to implement some or all of the functions of the systems and methods described herein. Alternatively, some or all functions may be implemented by a state machine that may not necessarily include stored program instructions, may be implemented in one or more Application Specific Integrated Circuits (ASICs), and/or may include functions that can be implemented as custom logic or circuitry. Of course, a combination of the aforementioned approaches may be used. For some of the embodiments described herein, a corresponding device in hardware (and optionally with software, firmware, and combinations thereof) can be referred to as "circuitry" or "logic" that is "configured to" or "adapted to" perform a set of operations, steps, methods, processes, algorithms, functions, techniques, etc., on digital and/or analog signals as described herein with respect to various embodiments.

The memory device 114 may include volatile memory elements (e.g., Random Access Memory (RAM), Dynamic RAM (DRAM), Synchronous DRAM (SDRAM), Static RAM (SRAM), and the like), nonvolatile memory elements (e.g., Read Only Memory (ROM), Programmable ROM (PROM), Erasable PROM (EPROM), Electrically-Erasable PROM (EEPROM), hard drive, tape, Compact Disc ROM (CD-ROM), and the like), or combinations thereof. Moreover, the memory device 114 may incorporate electronic, magnetic, optical, and/or other types of storage media. The memory device 114 may have a distributed architecture, where various components are situated remotely from one another, but can be accessed by the processing device 112.

The memory device 114 may include a data store, database (e.g., database 120), or the like, for storing data. In one example, the data store may be located internal to the control device 110 and may include, for example, an internal hard drive connected to the local interface 122 in the control device 110. Additionally, in another embodiment, the data store may be located external to the control device 110 and may include, for example, an external hard drive connected to the Input/Output (I/O) interfaces 116 (e.g., SCSI or USB connection). In a further embodiment, the data store may be connected to the control device 110 through a network and may include, for example, a network attached file server.

Software stored in the memory device 114 may include one or more programs, each of which may include an ordered listing of executable instructions for implementing logical functions. The software in the memory device 114 may also include a suitable Operating System (O/S) and one or more computer programs. The O/S essentially controls the execution of other computer programs, and provides scheduling, input/output control, file and data management, memory management, and communication control and related services. The computer programs may be configured to implement the various processes, algorithms, methods, techniques, etc. described herein.

Moreover, some embodiments may include non-transitory computer-readable media having instructions stored thereon for programming or enabling a computer, server, processor (e.g., processing device 112), circuit, appliance, device, etc. to perform functions as described herein. Examples of such non-transitory computer-readable medium may include a hard disk, an optical storage device, a magnetic storage device, a ROM, a PROM, an EPROM, an EEPROM, Flash memory, and the like. When stored in the non-transitory computer-readable medium, software can include instructions executable (e.g., by the processing device 112 or other suitable circuitry or logic). For example, when executed, the instructions may cause or enable the processing device 112 to perform a set of operations, steps, methods, processes, algorithms, functions, techniques, etc. as described herein according to various embodiments.

The methods, sequences, steps, techniques, and/or algorithms described in connection with the embodiments disclosed herein may be embodied directly in hardware, in software/firmware modules executed by a processor (e.g., processing device 112), or any suitable combination thereof. Software/firmware modules may reside in the memory device 114, memory controllers, Double Data Rate (DDR) memory, RAM, flash memory, ROM, PROM, EPROM, EEPROM, registers, hard disks, removable disks, CD-ROMs, or any other suitable storage medium.

Those skilled in the pertinent art will appreciate that various embodiments may be described in terms of logical blocks, modules, circuits, algorithms, steps, and sequences of actions, which may be performed or otherwise controlled with a general purpose processor, a DSP, an ASIC, an FPGA, programmable logic devices, discrete gates, transistor logic, discrete hardware components, elements associated with a computing device, controller, state machine, or any suitable combination thereof designed to perform or otherwise control the functions described herein.

The I/O interfaces 116 may be used to receive user input from and/or for providing system output to one or more devices or components. For example, user input may be received via one or more of a keyboard, a keypad, a touchpad, a mouse, and/or other input receiving devices. System outputs may be provided via a display device, monitor, User Interface (UI), Graphical User Interface (GUI), a printer, and/or other user output devices. I/O interfaces 116 may include, for example, one or more of a serial port, a parallel port, a Small Computer System Interface (SCSI), an Internet SCSI (iSCSI), an Advanced Technology Attachment (ATA), a Serial ATA (SATA), a fiber channel, InfiniBand, a Peripheral Component Interconnect (PCI), a PCI eXtended interface (PCI-X), a PCI Express interface (PCIe), an InfraRed (IR) interface, a Radio Frequency (RF) interface, and a Universal Serial Bus (USB) interface.

The interface 118 may be used to enable the control device 110 to provide control to the corresponding offset compensation unit (e.g., amplifiers and/or attenuators of elements 72, 74, 76, 78, 92, 94, 96, 98, 100, 102, 104) and/or to communicate over a section (e.g., OMS) in the embodiments in which the control device 110 is configured as a centralized controller for the OMS. The interface 118 in this case may therefore allow the control device 110 to be configured to communicate over a network or section of a network, such as the Internet, a Wide Area Network (WAN), a Local Area Network (LAN), and the like. The interface 118 may include, for example, an Ethernet card or adapter (e.g., 10BaseT, Fast Ethernet, Gigabit Ethernet, 10 GbE) or a Wireless LAN (WLAN) card or adapter (e.g., 802.11a/b/g/n/ac). The interface 118 may include address, control, and/or data connections to enable appropriate communications to the offset compensation unit or over the network or section (e.g., OMS).

Furthermore, the control device 110 includes a power offset compensation program 124, which may be configured to enable the control device to provide compensation actions with respect to a corresponding offset compensation device (e.g., adjustable amplifier, VOA, or the like). The power offset compensation program 124 may be implemented in any suitable combination of software, firmware, or the like and stored in a non-transitory computer-readable medium, such as the memory device 114, and/or hardware or the like and configured in the processing device 112. The power offset compensation program 124 may include instructions, logic, commands, or the like to enable the processing device 112 to perform certain functions related to the compensation of power offsets in the optical spectrum signals being carried throughout the network, OMS, or other section.

In general, the power offset compensation program 124 is configured to enable or cause the processing device 112 to determine if an upstream controller is currently performing an upstream action or intends to immediately perform the upstream action with respect to an upstream power compensation unit. Also, the power offset compensation program 124 is configured to enable the processing device 112 to determine if there is a need to perform a local action with respect to the local power compensation unit. Then, the power offset compensation program 124 enables the processing device 112 to perform the local action with respect to the local power compensation unit in response to a) determining that the upstream controller is not currently performing the upstream action or does not intend to immediately perform the upstream action and b) determining that there is a need to perform the local action.

Figure 7:
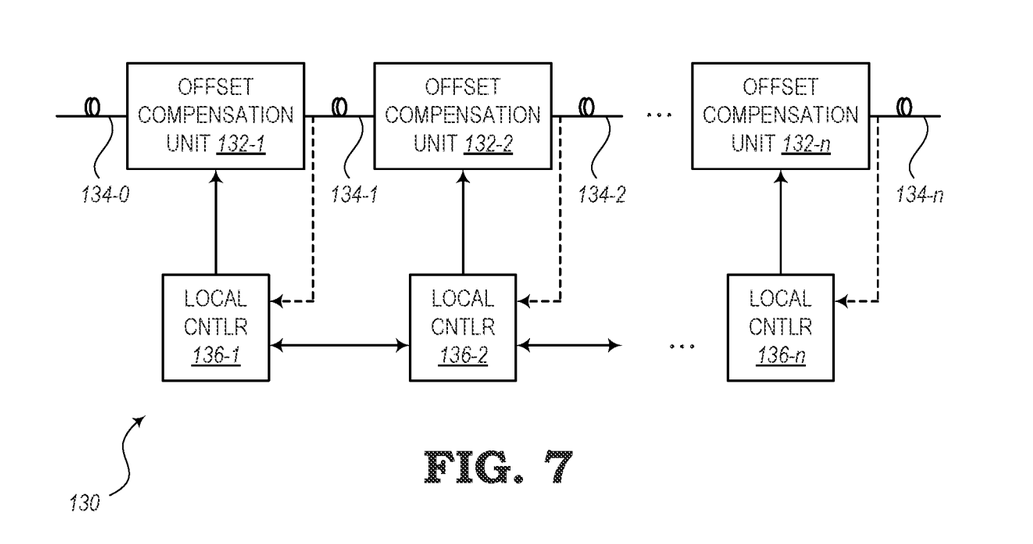
FIG. 7 is a block diagram illustrating a power offset control system, according to various embodiments of the present disclosure.

FIG. 7 is a block diagram illustrating an embodiment of a power offset control system 130. In this embodiment, the power offset control system 130 is configured to perform local control on a number of amplifier/attenuator devices throughout a section of a network or OMS where multiple fiber spans are configured to carry optical signal in a communications service. The power offset control system 130 includes offset compensation units 132-1, 132-2, ..., 132-n, where each offset compensation unit 132 is arranged between fiber spans 134-0, 134-1, 134-2, ..., 134-n of an OMS. Each offset compensation unit 132 is configured to provide amplification and/or attenuation of optical signals within any suitable photonic frequency band (e.g., C-band, L-band, C+L-band, etc.). Amplification may be performed by an adjustable amplifier element (e.g., Erbium-Doped Fiber Amplifier (EDFA), Raman amplifier, etc.) and attenuation may be performed by an adjustable attenuation element (e.g., Variable Optical Attenuator (VOA) or the like).

The power offset control system 130 further includes local controllers 136-1, 136-2, ..., 136-n, whereby each local controller 136 is associated with a respective offset compensation unit 132. As illustrated in FIG. 7, the local controller 136-1 is associated with the offset compensation unit 132-1, the local controller 136-2, is associated with the offset compensation unit 132-2, and so on. In some embodiments, each local controller 136 may represent the control device 110 of FIG. 6.

In response to measuring spectrum power applied to fiber span 134-1, the local controller 136-1 is configured to determine if adjustments are needed to the corresponding offset compensation unit 132-1 and adjust the amplifier and/or attenuator elements of the corresponding offset compensation unit 132-1 to adjust the power of the optical spectrum (e.g., including multiple optical channels) to within a desired range or tolerance. Adjustment may include increasing (amplifying) signals for some channels and/or decreasing (attenuating) signals for some other channels.

As described throughout the present disclosure, the adjustment or compensation of spectrum power outside acceptable ranges is performed in a specific sequence where the upstream controller (and corresponding offset compensation unit 132) performs compensation first, followed by the next (downstream) controller and compensator, followed by the next, and so on down the section of fiber spans 134 in the OMS.

Communication between the adjacent local controllers 136 allows one controller to determine the status of the upstream controller to see if it is active and/or if it is intending to immediately (or soon thereafter) start performing a power compensation action. Once the upstream controller finishes the compensation actions, the baton is passed to the next controller in line, where that controller can then measure the spectrum power at the beginning of the corresponding fiber span 134 and make adjustments to the corresponding offset compensation unit 132 as needed to bring the channel power within acceptable tolerances of the target power levels. Then, this controller passes the baton downstream to the next controller and the process continues.

Figure 8:
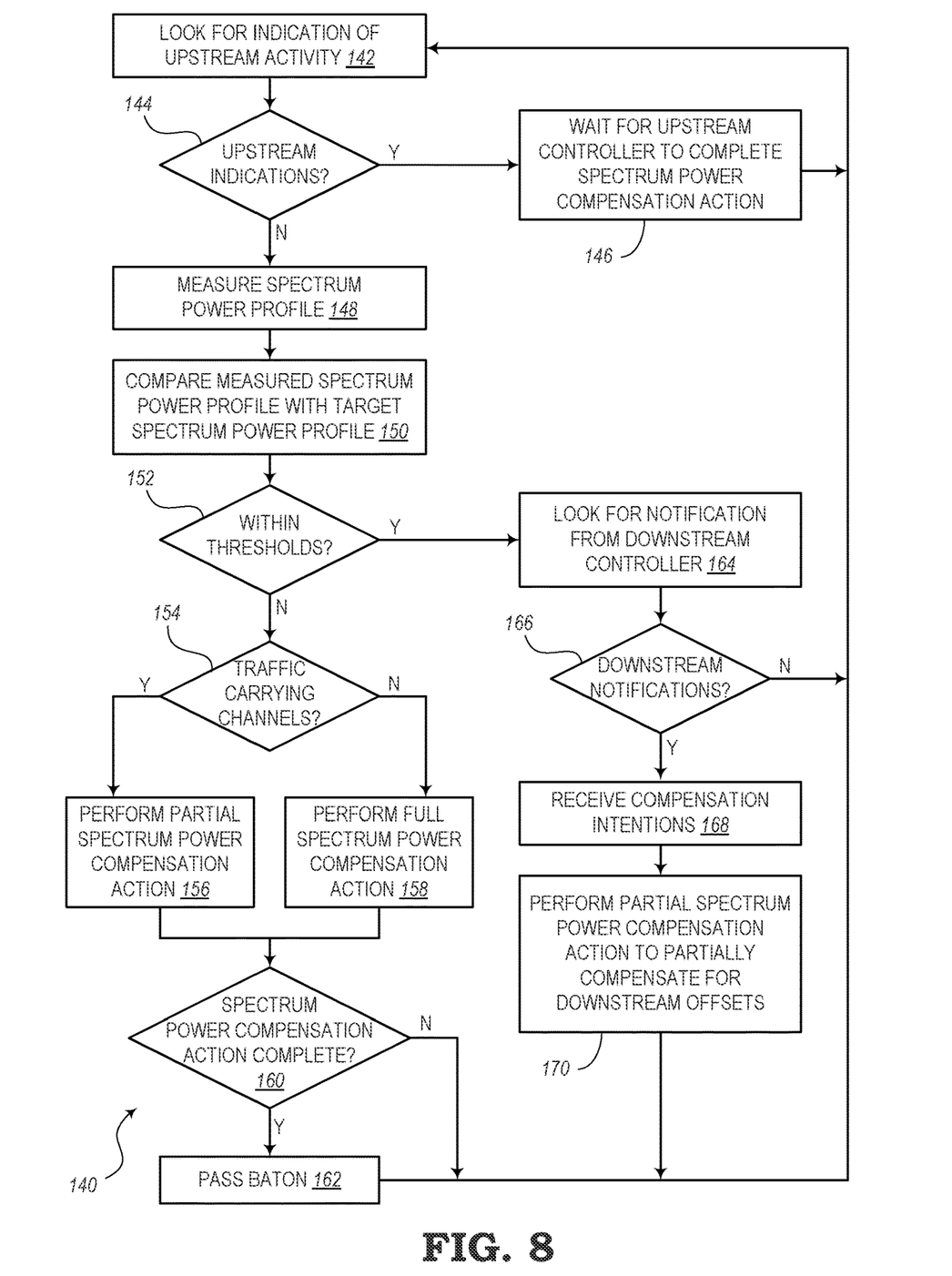
FIG. 8 is a flow diagram illustrating a process for compensating for spectral power, according to various embodiments of the present disclosure.

FIG. 8 is a flow diagram illustrating an embodiment of a process 140 for compensating for spectral power offsets. For example, the process 140 may be associated with the control device 110, the processing device 112, and/or power offset compensation program 124 shown in FIG. 6, may be associated with actions performed by one or more of the local controllers 136-1, 136-2, . . . , 136-n, and/or may be associated with other systems and methods operating in accordance with the various implementations described in the present disclosure.

In this embodiment, the process 140 includes the step of looking for an indication of upstream activity, as indicated in block 142. This may include determining the status of an upstream controller, receiving a notification (e.g., baton flag, etc.) from the upstream controller that it does not intend to perform any immediate compensation actions, etc. In response to determining, as indicated in decision block 144, that there is at least indication of upstream activity, the process 140 goes to block 146. As indicated in block 146, the process 140 waits for the upstream controller to complete the spectrum power compensation action and then returns to block 142. However, if it is determined in decision block 144 that there are no upstream indications, the process 140 proceeds to block 148.

As indicated in block 148, the process 140 includes the step of measuring the spectrum power profile at the output of the corresponding offset compensation unit 132 (e.g., input to the applicable fiber span 134). Then, the process 140 includes comparing the measured spectrum power profile with a target spectrum power profile, as indicated in block 150. The process further includes determining if the measured spectrum power profile is within acceptable tolerance of the target spectrum power profile, as indicated in decision block 152. If within acceptable tolerances, compensation at this stage is not needed and the process 140 goes to block 164 to handle downstream compensation needs. Otherwise, if the local spectrum power profile is not within acceptable tolerances, the process 140 proceeds to decision block 154 to handle the local compensation needs.

As indicated in decision block 154, the process 140 includes the step of determining if the local spectrum profile is representative of traffic-carrying channels where actual in-service photonic signals are being carried. If so, the process 140 goes to block 156. Otherwise, if the spectrum is representative of Amplified Spontaneous Emission (ASE) signals that have been used to fill empty channels of the spectrum, the process goes to block 158. In block 156, the process 140 includes the step of performing a partial spectrum power compensation action on the traffic-carrying channels. Otherwise, the process 140 includes the step of performing a full spectrum power compensation action (block 158) if only ASE channels are present.

After the partial or full compensation actions indicated in blocks 156 and 158, the process 140 includes the step of determining if the spectrum power compensation action is complete, as indicated in decision block 160. If so, the process 140 includes passing a baton (e.g., sending a "completion" flag) to the next controller in the downstream direction and returning to the start of the process 140 at block 142.

Regarding the branch of the process 140 related to the downstream handling steps, the process 140 includes the step of looking for a notification from the downstream controller, as indicated in block 164. The process 140 includes determining if there are any downstream notifications that the downstream controller has the intention to perform compensation actions (e.g., power compensation is needed), as indicated in decision block 166. If there are no downstream notifications, the process 140 loops back to the start to begin the detection of any need for compensation anywhere in the OMS. Otherwise, if there are one or more downstream notifications, the process 140 may include the following steps according to some embodiments. For example, the process 140 may include receiving information regarding the compensation intentions of the downstream controller, as indicated in block 168. Then, as a proactive measure, the process 140 may include performing a partial spectrum power compensation action to partially compensate for downstream offsets, as indicated in block 170, to thereby reduce the amount of compensation that may be needed downstream. Of course, with this proactive compensation, the downstream controller would need to re-evaluate the spectrum power profile to determine what compensation might be needed after the proactive compensation actions. After this, the process 140 loops back to the top and continues the spectrum measurement and compensation procedures.

Figure 9:
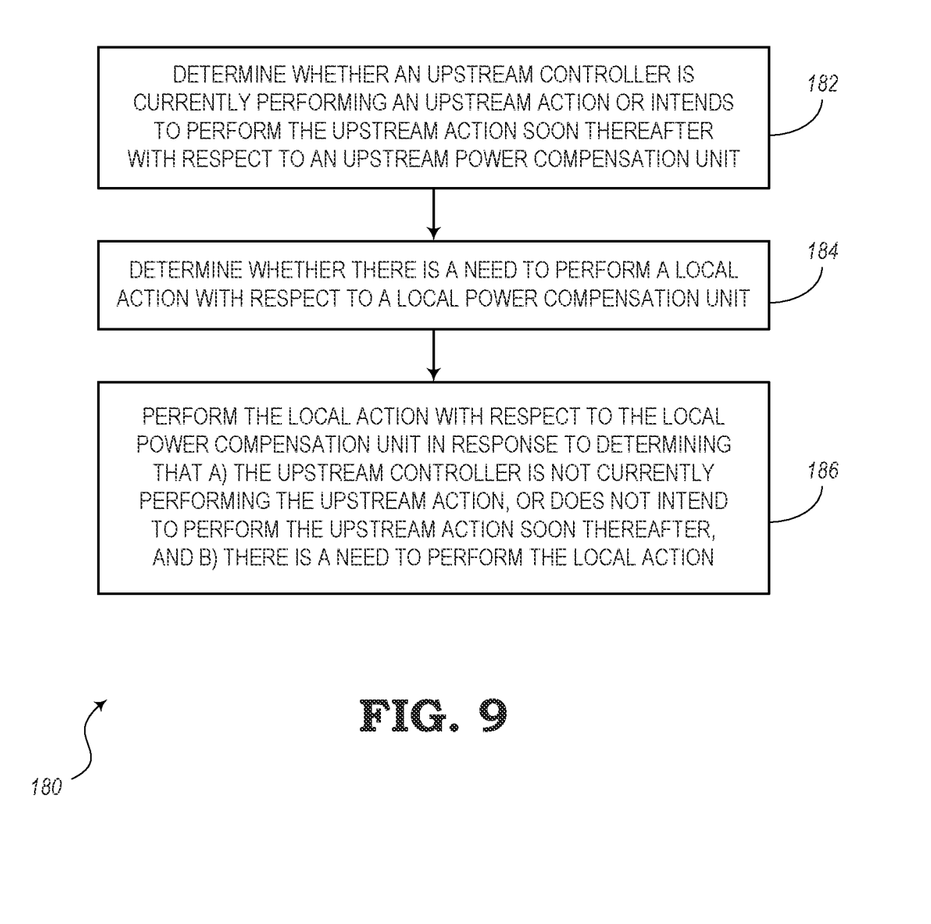
FIG. 9 is a flow diagram illustrating another process for compensating for spectral power, according to various embodiments of the present disclosure.

FIG. 9 is a flow diagram illustrating another embodiment of a process 180 for compensating for spectral power. In this embodiment, the process 180 includes the step of determining whether an upstream controller is currently performing an upstream action, or intends to perform the upstream action soon thereafter, with respect to an upstream power compensation unit, as indicated in block 182. The process 180 is also configured to determine whether there is a need to perform a local action with respect to the local power compensation unit, as indicated in block 184. The process 180 is also configured to perform the local action with respect to the local power compensation unit in response to determining that a) the upstream controller is not currently performing the upstream action or does not intend to immediately perform the upstream action, and b) there is a need to perform the local action, as indicated in block 186.

It may be noted that the phrase "soon thereafter" may be interpreted as happening essentially immediately following a normal course of signal processing steps by a suitable processing device (e.g., processing device 112). Also, "soon thereafter" may be any suitable time (e.g., less than several seconds) in the context of a photonic line system or OMS.

Also, according to further implementations, the upstream action described above may include adjusting the upstream power compensation unit to compensate for power offsets in spectrum signals at an output of the upstream power compensation unit. The local action may include adjusting the local power compensation unit to compensate for power offsets in spectrum signals at an output of the local power compensation unit. In response to determining that the upstream controller is currently performing the upstream action or intends to immediately perform the upstream action, the process 180 may also include waiting for the upstream controller to complete the upstream action before performing the local action.

The step of determining if there is a need to perform the local action (block 184) may include the steps of a) measuring a spectrum power profile, b) comparing the measured spectrum power profile with a target spectrum power profile, and c) determining if the measured spectrum power profiled is within an acceptable tolerance with respect to the target spectrum power profile. In response to determining that there is a need to perform the local action, the process 180 may also include determining whether channels of a spectrum include traffic-carrying signals or Amplified Spontaneous Emission (ASE) signals. In response to determining that the channels include traffic-carrying signals, the process 180 may include performing a partial spectrum power compensation action with respect to the local power compensation unit, while, in response to determining that the channels include ASE signals, the process 180 may perform a full spectrum power compensation action with respect to the local power compensation unit.

In some embodiments, the step of determining that the upstream controller does not intend to immediately perform the upstream action may include receiving a baton flag from the upstream controller. The process 180 may also include determining if a downstream controller intends to immediately perform a downstream action with respect to a downstream power compensation unit. Then, the step of performing a partial spectrum power compensation action with respect to the local power compensation unit may be executed in response to determining that the downstream controller intends to immediately perform the downstream action. The process 180 may be executed so as to ensure that the upstream controller, local controller, and downstream controller perform the actions with respect to the associated upstream power compensation unit, local power compensation unit, and downstream power compensation unit one at a time in a downstream-directed sequence.

In addition, the local power compensation unit and upstream power compensation unit described in the process 180 may be arranged in an Optical Multiplex Section (OMS) and are configured to perform the local action and upstream action, respectively, to reduce spectrum power offsets in the OMS while the OMS is in service. Upon receiving an indication from the upstream controller that the upstream controller intends to immediately perform the upstream action while the local action is being performed, the process 180 may include aborting the local action and waiting for the completion of the upstream action.

Therefore, the systems and methods of the present disclosure may provide certain point of novelty with respect to conventional systems. For example, the present embodiments develop a distributed control mechanism that is independent of section-wide end-to-end dependency in terms of communications requirements or algorithm dependency. The peer-to-peer messaging allows the controllers to maintain the condition whereby only one controller is running at a time within the section, and that the sequence relies on a "stable" upstream to perform local compensation for spectrum power offsets from the target profiles. The systems and methods implement a distributed triggering system for determining which stage of a section receives power compensation. This may be determined by an individual (local) controller that is not dictated or sequenced by a centralized controller, a section-head, or a section-tail. The compensation actions instead are gated by (or dependent upon) notifications from the immediate upstream controller or node, which does not necessarily take on an Optical Supervisory Channel (OSC) role. That is, the systems and methods may be configured to handle a lack of OSC for incoming spectrum as a special case and rely on local trigger only. These and other novel aspects of the present disclosure are considered to be an improvement over the conventional systems, particularly to enable evenly-distributed compensation actions to correct power offsets in a photonic line system, even without a centralized controller.

It may be noted that the compensation actions described in the present disclosure are configured to take place during normal operation of a system. That is, compensation can be performed while the OMS is in-service. Although some calibration operations may take place before a system in put in service, the power offset compensation described herein can be a continual process during normal operation of the communication services.

Also, network criteria may change over time. For example, if the spectrum profile (e.g., the "target power" shown in FIG. 3) is changed in a network, the local controllers may be configured to adjust to the new targets by providing the downstream-directed compensation actions, such as allowing an upstream controller to complete a power compensation action and then performing local compensation when the upstream controller provides a notification (e.g., baton) that it is finished.

Furthermore, the embodiments of the present disclosure may be configured to restore power when power goes down and is brought back up. In the present disclosure, description of the power compensation may also refer to compensation to a power profile, compensation to an Optical Signal to Noise Ratio (OSNR) profile, or compensation with respect to other forms of power measurements.

Again, the embodiments herein may be defined as a sequential procedure that proceeds from upstream to downstream. Also, it may be noted that parallel compensation efforts may not be useful since the effects of compensation at an upstream offset compensation unit (e.g., amplifiers, attenuators, etc.) may not be felt until immediately after the upstream compensation actions are complete (or soon afterwards). Performing multiple compensation actions in a cascaded system can cause a ringing effect in a system, as is evident in conventional system. However, the embodiments of the present disclosure therefore perform a non-parallel procedure (or serial procedure) in a downstream-directed order to avoid ringing and other negative consequences.

A sequencer (orchestrator) can be used to sequence activity node by node. Knowing that a power (or OSNR) shortfall is present, a system may be configured to sequence the compensation actions node by node (or hop-by-hop). The orchestrator does not have an end-to-end view, which is a key criteria. It may have a distributed view.

Also, end-to-end controllers can be complex in conventional system. Therefore, the embodiments discussed herein use a system where controllers are able to communicate with neighboring controllers to coordinate compensation actions.

It may be noted that the present disclosure may be applicable to any type of OMS, photonic line system, or the like. This may also apply to foreign links as well. Also, with respect to submarine lines, the embodiments of the present disclosure may be used to control amplification and attenuation as needed for long distance transport and may take advantage of the pre-emptive (or proactive) compensation actions described with respect to the steps described in blocks 164, 166, 168, and 170 shown in the process 140 of FIG. 8, as needed.

Also, the embodiments may be implemented in any suitable controller or Network Element (NE) in a network. Furthermore, the embodiments may be implemented in a Software-Defined Networking (SDN) component for performing offset compensation actions.

Although the present disclosure has been illustrated and described herein with reference to various embodiments and examples, it will be readily apparent to those of ordinary skill in the art that other embodiments and examples may perform similar functions, achieve like results, and/or provide other advantages. Modifications, additions, or omissions may be made to the systems, apparatuses, and methods described herein without departing from the spirit and scope of the present disclosure. All equivalent or alternative embodiments that fall within the spirit and scope of the present disclosure are contemplated thereby and are intended to be covered by the following claims.

What is claimed is:

1. A local controller associated with a local power compensation unit configured to adjust power levels of optical channels on a fiber span, the local controller comprising
a processing device, and
a memory device configured to store a computer program having instructions that, when executed, enable the processing device to
determine whether an upstream controller is currently performing an upstream action, or intends to perform the upstream action soon thereafter, with respect to an upstream power compensation unit that is configured to adjust the power levels of the optical channels on an upstream fiber span connected to the fiber span, wherein the upstream action includes adjusting the upstream power compensation unit to adjust the power levels to compensate for power offsets in the optical channels at an output of the upstream power compensation unit,
determine whether there is a need to perform a local action with respect to the local power compensation unit, wherein the local action includes adjusting the local power compensation unit to adjust the power levels to compensate for power offsets in the optical channels at an output of the local output of the local power compensation unit, and
perform the local action with respect to the local power compensation unit in response to determining that the upstream controller is not currently performing the upstream action, or does not intend to perform the upstream action soon thereafter, and there is a need to perform the local action.

2. The local controller of claim 1, wherein, in response to determining that the upstream controller is currently performing the upstream action or intends to perform the upstream action soon thereafter, the instructions further enable the processing device to wait for the upstream controller to complete the upstream action before performing the local action.

3. The local controller of claim 1, wherein the step of determining if there is a need to perform the local action includes the steps of
measuring a spectrum power profile at target location,
comparing the measured spectrum power profile with a target spectrum power profile, and
determining if the measured spectrum power profiled is within an acceptable tolerance with respect to the target spectrum power profile.

4. The local controller of claim 1, wherein the step of determining if there is a need to perform the local action includes the steps of
measuring a spectrum gain/loss profile wherein, the spectrum measured gain/loss profile is difference of a measured spectrum power profile at output and input,
deriving a target gain/loss profile wherein, the spectrum target gain/loss profile is difference of a target spectrum power profile at output and measured spectrum power profile at input, and
determining if the measured spectrum gain/loss profile is within an acceptable tolerance with respect to the target spectrum gain/loss profile.

5. The local controller of claim 1, wherein, in response to determining that there is a need to perform the local action, the instructions further enable the processing device to
determine whether channels of a spectrum include traffic-carrying signals or Amplified Spontaneous Emission (ASE) signals,
in response to determining that the channels include traffic-carrying signals, perform a partial spectrum power compensation action with respect to the local power compensation unit, and
in response to determining that the channels include ASE signals, perform a full spectrum power compensation action with respect to the local power compensation unit.

6. The local controller of claim 1, wherein determining that the upstream controller does not intend to perform the upstream action soon thereafter includes receiving a baton flag from the upstream controller.

7. The local controller of claim 1, wherein the instructions further enable the processing device to
determine if a downstream controller intends to immediately perform a downstream action with respect to a downstream power compensation unit, and
perform a partial spectrum power compensation action with respect to the local power compensation unit in response to determining that the downstream controller intends to immediately perform the downstream action.

8. The local controller of claim 7, wherein the instructions further enable the processing device to ensure that the upstream controller, local controller, and downstream controller perform the actions with respect to the associated upstream power compensation unit, local power compensation unit, and downstream power compensation unit one at a time in a downstream-directed sequence.

9. The local controller of claim 1, wherein the local power compensation unit and upstream power compensation unit are arranged in an Optical Multiplex Section (OMS) and are configured to perform the local action and upstream action, respectively, to reduce spectrum power offsets in the OMS while the OMS is in service.

10. The local controller of claim 1, wherein, upon receiving an indication from the upstream controller that the upstream controller intends to immediately perform the upstream action while the local action is being performed, the instructions further enable the processing device to abort the local action and wait for the completion of the upstream action.

11. A non-transitory computer-readable medium configured to store computer logic having instructions that, when executed, cause one or more processing devices to:
   determine whether an upstream controller is currently performing an upstream action, or intends to perform the upstream action soon thereafter, with respect to an upstream power compensation unit that is configured to adjust power levels of optical channels on an upstream fiber span connected to a fiber span, wherein the upstream action includes adjusting the upstream power compensation unit to adjust the power levels to compensate for power offsets in the optical channels at an output of the upstream power compensation unit,
   determine whether there is a need to perform a local action with respect to a local power compensation unit that is configured to adjust power levels of the optical channels on the fiber span, wherein the local action includes adjusting the local power compensation unit to adjust the power levels to compensate for power offsets in the optical channels at an output of the local power compensation unit, and
   perform the local action with respect to the local power compensation unit in response to determining that
      the upstream controller is not currently performing the upstream action, or does not intend to perform the upstream action soon thereafter, and
      there is a need to perform the local action.

12. The non-transitory computer-readable medium of claim 11, wherein, in response to determining that the upstream controller is currently performing the upstream action or intends to perform the upstream action soon thereafter, the instructions further cause the one or more processing devices to wait for the upstream controller to complete the upstream action before performing the local action.

13. The non-transitory computer-readable medium of claim 11, wherein the step of determining if there is a need to perform the local action includes the steps of
   measuring one of a spectrum power profile or a spectrum gain/loss profile,
   comparing one of the measured spectrum power profile or the measured gain/loss profile with one of a target spectrum power profile or a target spectrum gain/loss profile, and
   determining if the measured spectrum power profile or the measured gain/loss profile is within an acceptable tolerance with respect to the target spectrum power profile or the target spectrum gain/loss profile.

14. The non-transitory computer-readable medium of claim 11, wherein, in response to determining that there is a need to perform the local action, the instructions further cause the one or more processing devices to
   determine whether channels of a spectrum include traffic-carrying signals or Amplified Spontaneous Emission (ASE) signals,
   in response to determining that the channels include traffic-carrying signals, perform a partial spectrum power compensation action with respect to the local power compensation unit, and
   in response to determining that the channels include ASE signals, perform a full spectrum power compensation action with respect to the local power compensation unit.

15. The non-transitory computer-readable medium of claim 11, wherein determining that the upstream controller does not intend to perform the upstream action soon thereafter includes receiving a baton flag from the upstream controller.

16. A method comprising the steps of:
   determining whether an upstream controller is currently performing an upstream action, or intends to perform the upstream action soon thereafter, with respect to an upstream power compensation unit that is configured to adjust power levels of optical channels on an upstream fiber span connected to a fiber span, wherein the upstream action includes adjusting the upstream power compensation unit to adjust the power levels to compensate for power offsets in the optical channels at an output of the upstream power compensation unit,
   determine whether there is a need to perform a local action with respect to a local power compensation unit that is configured to adjust power levels of the optical channels on the fiber span, wherein the local action includes adjusting the local power compensation unit to adjust the power levels to compensate for power offsets in the optical channels at an output of the local output of the local power compensation unit, and
   performing the local action with respect to the local power compensation unit in response to determining that
      the upstream controller is not currently performing the upstream action, or does not intend to perform the upstream action soon thereafter, and
      there is a need to perform the local action.

17. The method of claim 16, further comprising the steps of
   determining if a downstream controller intends to immediately perform a downstream action with respect to a downstream power compensation unit,
   performing a partial spectrum power compensation action with respect to the local power compensation unit in response to determining that the downstream controller intends to immediately perform the downstream action, and
   ensuring that the upstream controller, local controller, and downstream controller perform the actions with respect to the associated upstream power compensation unit, local power compensation unit, and downstream power compensation unit one at a time in a downstream-directed sequence.

18. The method of claim 16, wherein the local power compensation unit and upstream power compensation unit are arranged in an Optical Multiplex Section (OMS) and are configured to perform the local action and upstream action, respectively, to reduce spectrum power offsets in the OMS while the OMS is in service.

* * * * *